(12) United States Patent
Shinozaki et al.

(10) Patent No.: US 11,916,412 B2
(45) Date of Patent: Feb. 27, 2024

(54) ELECTRIC VEHICLE

(71) Applicant: SUBARU CORPORATION, Tokyo (JP)

(72) Inventors: Tomoki Shinozaki, Tokyo (JP); Kunihiko Kuronuma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 499 days.

(21) Appl. No.: 17/237,902

(22) Filed: Apr. 22, 2021

(65) Prior Publication Data
US 2021/0376621 A1 Dec. 2, 2021

(30) Foreign Application Priority Data
May 29, 2020 (JP) .................................. 2020-094129

(51) Int. Cl.
*H02J 7/00* (2006.01)
*B60L 3/00* (2019.01)
*B60L 50/51* (2019.01)

(52) U.S. Cl.
CPC ............ *H02J 7/0024* (2013.01); *B60L 3/003* (2013.01); *B60L 50/51* (2019.02); *B60L 2210/40* (2013.01)

(58) Field of Classification Search
CPC ....... H02J 7/0024; H02J 7/1446; B60L 3/003; B60L 50/51; B60L 2210/40; B60L 3/0061; B60L 3/0046; Y02T 10/70; Y02T 10/92

USPC ....................................................... 307/10.6
See application file for complete search history.

(56) References Cited

U.S. PATENT DOCUMENTS

2015/0298551 A1* 10/2015 Oi .......................... B60L 3/0007 318/3
2017/0317615 A1* 11/2017 Berry .................... H02H 7/0838
2019/0135119 A1 5/2019 Nozawa

FOREIGN PATENT DOCUMENTS

JP 2019-088142 A 6/2019

* cited by examiner

*Primary Examiner* — Richard Tan
(74) *Attorney, Agent, or Firm* — MCGINN I.P. LAW GROUP, PLLC

(57) ABSTRACT

An electric vehicle includes an electric motor, an inverter, a battery, a first switch, an electric power converter circuit, and a second switch. The inverter is configured to drive the electric motor. The battery is configured to supply electric power to the inverter. The first switch is normally open, and configured to open and close an electric power line provided between the battery and the inverter. The second switch is normally closed, and coupled between an electric power line of the electric motor and the electric power converter circuit. The electric power converter circuit is configured to, in a case where the electric power converter circuit receives a back electromotive voltage from the electric motor via the second switch, generate a voltage that drives the first switch to be in a close state, on the basis of the back electromotive voltage.

16 Claims, 2 Drawing Sheets

ELECTRIC VEHICLE

CROSS-REFERENCE TO RELATED APPLICATIONS

The present application claims priority from Japanese Patent Application No. 2020-094129 filed on May 29, 2020, the entire contents of which are hereby incorporated by reference.

BACKGROUND

The technology relates to an electric vehicle.

In general, an electric vehicle such as EV (Electric Vehicle) or HEV (Hybrid Electric Vehicle) includes a battery and a system main relay. The battery supplies electric power used for traveling of the electric vehicle. The system main relay is adapted to open and close an electric power line coupled to the battery. For example, Japanese Unexamined Patent Application Publication No. 2019-88142 discloses an electric vehicle that includes, between an inverter circuit and a main battery, the system main relay that opens and closes the electric power line.

SUMMARY

An aspect of the technology provides an electric vehicle including an electric motor, an inverter, a battery, a first switch, an electric power converter circuit, and a second switch. The inverter is configured to drive the electric motor. The battery is configured to supply electric power to the inverter. The first switch is normally open, and configured to open and close an electric power line provided between the battery and the inverter. The second switch is normally closed, and coupled between an electric power line of the electric motor and the electric power converter circuit. The electric power converter circuit is configured to, in a case where the electric power converter circuit receives a back electromotive voltage from the electric motor via the second switch, generate a voltage that drives the first switch to be in a close state, on the basis of the back electromotive voltage.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
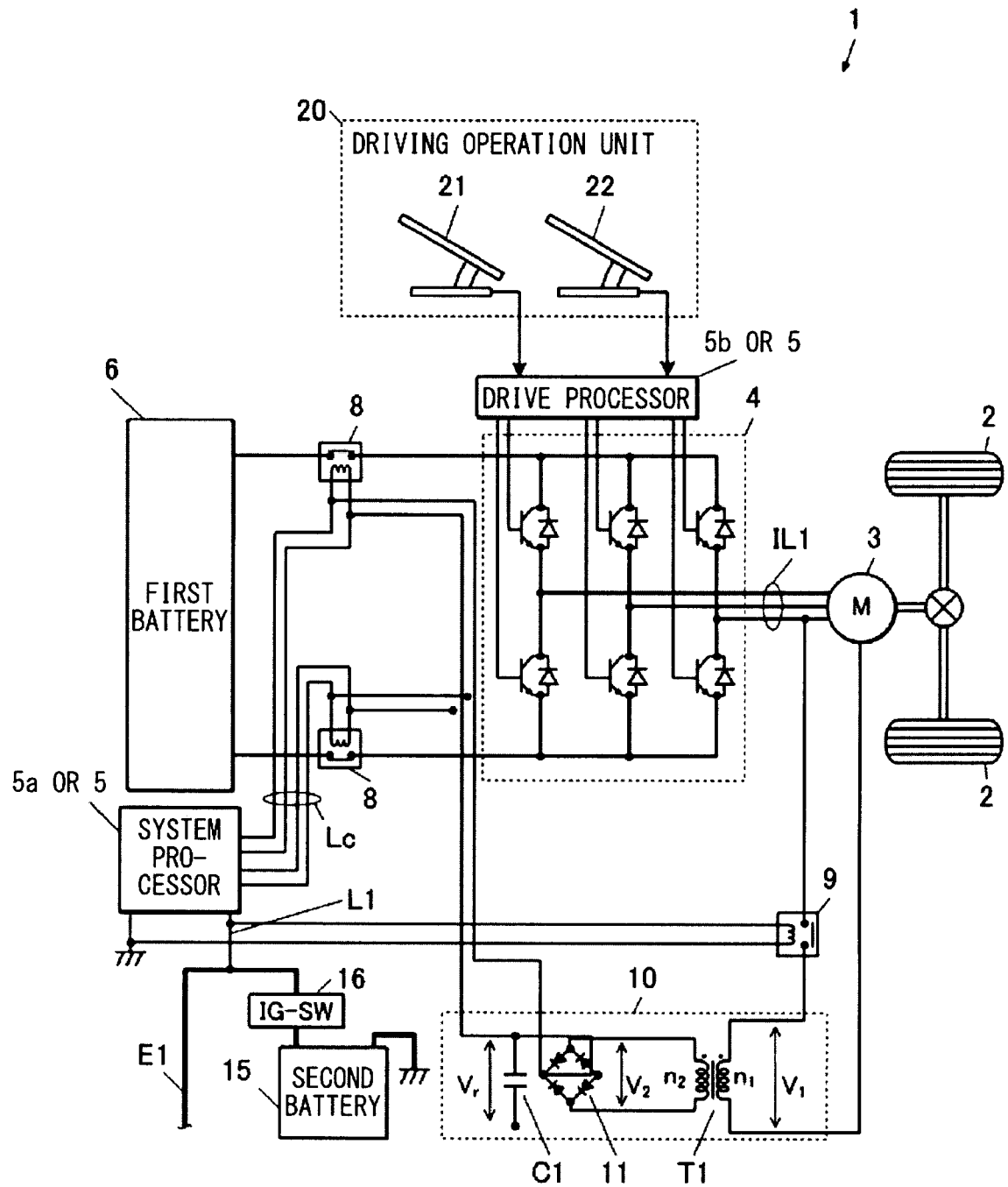
FIG. 1 is a diagram illustrating an example of a configuration of an electric vehicle according to one example embodiment of the technology.

Any abnormality during operation of an electric motor can switch a system main relay to an open state. Under such circumstances, if a regenerative operation is performed on the electric motor, an extremely high back electromotive voltage may possibly be applied to an electric power line of the electric motor due to a loss of a supply destination of a regenerative current.

It is desirable to provide an electric vehicle that makes it possible to suppress a back electromotive voltage to be applied to an electric power line of an electric motor even in a case where a system main relay is switched to an open state during operation of the electric motor.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

An electric vehicle 1 according to an example embodiment of the technology may be any electric vehicle such as EV (Electric Vehicle) or HEV (Hybrid Electric Vehicle). The electric vehicle 1 may include drive wheels 2, a traveling motor 3, a first battery 6, a second battery 15, a driving operation unit 20, and a processor 5. The traveling motor 3 may generate driving force of the drive wheels 2. The first battery 6 may store electric power used for traveling of the electric vehicle 1. The second battery 15 may supply an electric power supply voltage that is lower than an electric power supply voltage of the first battery 6. The driving operation unit 20 may receive a driving operation to be performed by a driver. The processor 5 may control each device, unit, etc., of the electric vehicle 1. Non-limiting examples of the first battery 6 may include a lithium-ion battery and a nickel-metal-hydride battery. The first battery 6 may output a high voltage that drives the traveling motor 3, and may be referred to as a high-voltage battery. The second battery 15 may supply the electric power supply voltage to the processor 5, an auxiliary device, and an accessory device. For example, the electric power supply voltage of the second battery 15 may be 12 volts. The driving operation unit 20 may include devices including, for example, an accelerator pedal 21 and a brake pedal 22. In one embodiment, the first battery 6 may serve as a "battery". In one embodiment, the traveling motor 3 may serve as an "electric motor".

The electric vehicle 1 further includes an inverter 4, a first switch 8, a second switch 9, and an electric power converter circuit 10. The inverter 4 may receive the electric power stored in the first battery 6 and drives the traveling motor 3. The first switch 8 opens and closes an electric power line provided between the first battery 6 and the traveling motor 3. The second switch 9 is coupled between an electric power line IL1 of the traveling motor 3 and the electric power converter circuit 10. The electric power converter circuit 10 generates a voltage that drives the first switch 8 to be in a close state, on the basis of a back electromotive voltage of the traveling motor 3 supplied from the electric power line IL1 via the second switch 9.

The first switch 8 may be provided for each of the electric power lines disposed as a pair between the first battery 6 and the inverter 4. The first switch 8 may be referred to as a system main relay. The first switch 8 may be a contactor or a relay that is normally open, and may be driven to be in the closed state to couple the first battery 6 to a high voltage line of the electric vehicle 1. The first switch 8 may be released from the driving that places the first switch 8 into the closed state and thus switched to an open state to cut off a supply of a high voltage of the first battery 6 from the high voltage line of the electric vehicle 1. The normally-open first switch 8 may disconnect the first battery 6 from the high voltage line of the electric vehicle 1 in response to a stop of a supply of a drive voltage during, for example, a system shutdown of the electric vehicle 1. The first switch 8 may be switched to the closed state in response to excitation of a coil provided in the first switch 8 resulting from an output of the drive voltage to a control line Lc.

The second switch 9 may be a contactor or a relay that is normally closed. The second switch 9 may open and close a line that couples the electric power line IL1 of the traveling motor 3 and an input terminal of the electric power converter circuit 10. For example, one of the two input terminals of the electric power converter circuit 10 may be coupled via the line to one of the three-phase electric power lines IL1 of the traveling motor 3, and the line may be provided with the second switch 9. The other of the two input terminals of the electric power converter circuit 10 may be coupled to a grounding line of the traveling motor 3 or to another one of the three-phase electric power lines IL1.

The processor 5 may include a system processor 5a and a drive processor 5b. The system processor 5a may control the first switch 8 to be in the open state or in the closed state. The drive processor 5b may so drive the inverter 4 that the driving force or braking force is generated on the basis of the operation performed on the driving operation unit 20. The system processor 5a may control the first switch 8 to be in the open state or in the closed state in response to a start-up request and a shutdown request of a system of the electric vehicle 1. The start-up request and the shutdown request of the system may be given by the operation performed by the driver. For example, the start-up request of the system may be based on a turning-on operation of a power button or a turning-on operation by means of an engine key. For example, the shutdown request of the system may be based on a turning-off operation of the power button or a turning-off operation by means of the engine key. The system processor 5a may also serve as a battery processor that monitors a state of the first battery 6 and manages the first battery 6. The processor 5 may be or may include a single ECU (Electronic Control Unit), or may be or may include multiple ECUs that operate in conjunction with each other. In some embodiments, the system processor 5a and the drive processor 5b may be the respective ECUs that are different from each other. In some embodiments, the system processor 5a and the battery processor may be the same ECU. In some embodiments, the system processor 5a may not serve as the battery processor, and the system processor 5a and the battery processor may be the respective ECUs that are different from each other.

The system processor 5a may output the drive voltage to the first switch 8 to switch the first switch 8 to the closed state during operation of the system. The drive voltage may be outputted directly from the system processor 5a. Alternatively, the drive voltage may be outputted from a current-outputting switch, such as a semiconductor switch, on the basis of a control performed by the system processor 5a. The system processor 5a may output the drive voltage by means of a first power E1. For example, the first power E1 may be ignition power. The first power E1 may be low-voltage-based power, such as 12 volts power, outputted via a switch (IG-SW) 16 during the operation of the system of the electric vehicle 1, and may be supplied from the second battery 15. Alternatively, the first power E1 may be supplied from a generator or a DC/DC converter which is unillustrated.

The second switch 9 may be switched to an open state during the operation of the system in response to a supply of the voltage of the first power E1 to a control line. The control line of the second switch 9 may be so coupled that a drive voltage is drawn from a location near the control line of the first switch 8. In some embodiments, the control line of the second switch 9 may be coupled to a power leading line L1 of the system processor 5a. In some embodiments, the control line of the second switch 9 may be coupled near a power input terminal of the current-outputting switch in a case where the system processor 5a outputs the drive voltage to the first switch 8 via the current-outputting switch. Coupling the control line of the second switch 9 as described above makes it possible to switch the second switch 9 from the open state to a closed state as well in conjunction with the switching of the first switch 8, in a case where the first switch 8 is switched from the closed state to the open state due to an abnormality of the drive voltage.

Note that the coupling of the control line of the second switch 9 is not limited to some examples described above. In some embodiments, the second switch 9 may be so coupled that the system processor 5a may control the second switch 9 to be in the open state or the closed state as with the first switch 8. In some embodiments, the second switch 9 may be coupled to another processor that monitors an abnormality of the first switch 8, and a configuration may be employed in which the drive voltage of the first switch 8 is decreased in a case where the processor has detected the abnormality of the first switch 8, and in which the drive voltage of the second switch 9 is decreased as well in response to the decrease in the drive voltage supplied to the first switch 8 due to the abnormality.

Figure 2A:
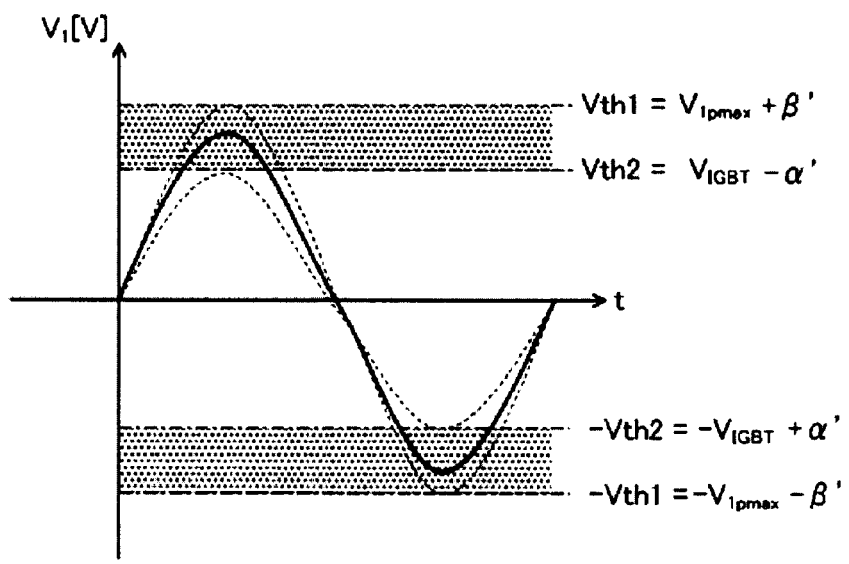
FIG. 2A is a diagram illustrating an example of an input voltage of an electric power converter circuit illustrated in FIG. 1.
Figure 2B:
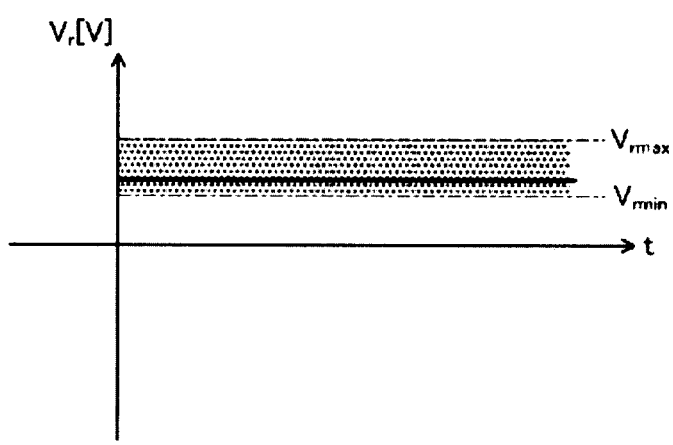
FIG. 2B is a diagram illustrating an example of an output voltage of the electric power converter circuit illustrated in FIG. 1.

FIGS. 2A and 2B respectively illustrate an example of an input voltage and an example of an output voltage of the electric power converter circuit 10.

The electric power converter circuit 10 may receive an alternating-current voltage $V_1$ and output a direct-current voltage $V_r$ that has been decreased in voltage. The electric power converter circuit 10 may include a transformer T1, a rectifier circuit 11, and a smoothing capacitor C1 as illustrated in FIG. 1. The transformer T1 may decrease the alternating-current voltage. The rectifier circuit 11 may rectify the alternating-current voltage that has been decreased in voltage. The smoothing capacitor C1 may smooth the voltage rectified by the rectifier circuit 11. The electric power converter circuit 10 may not have a control circuit unlike a switching regulator, and include passive devices except for the rectifier circuit 11. For example, the rectifier circuit 11 may be a full-wave rectifier circuit or a half-wave rectifier circuit. In some embodiments, the electric power converter circuit 10 may not have the smoothing capacitor C1. The electric power converter circuit 10 may include the passive devices and the rectifier circuit 11, allowing the direct-current voltage $V_r$ corresponding to the alternating-current voltage $V_1$ to be outputted instantaneously upon the reception of the alternating-current voltage $V_1$.

The input terminal of the electric power converter circuit 10 may be coupled via the second switch 9 to the electric power line IL1 provided between the traveling motor 3 and the inverter 4. The electric power converter circuit 10 may receive the alternating-current voltage flowing through the electric power line ILL in a case where the second switch 9 is in the closed state. As illustrated by way of example in FIG. 2A, the electric power converter circuit 10 can receive the extremely high alternating-current voltage $V_1$ that is equal to or less than a maximum back electromotive voltage $V_{1pmax}$ of the traveling motor 3. For example, the maximum back electromotive voltage $V_{1pmax}$ may be 600 volts.

The electric power converter circuit 10 may output the direct-current voltage $V_r$ to the control line Lc of the first switch 8. In some embodiments, the drive voltage that drives the first switch 8 to be in the closed state normally may be: equal to or greater than a minimum exciting voltage $V_{rmin}$ that allows for excitation of the coil of the first switch 8; and equal to or less than a maximum allowable voltage $V_{rmax}$ that is less likely to or does not cause a deterioration of the coil, such as a burnout. For example, the electric power converter circuit 10 may drive the first switch 8 normally to be in the closed state in a case where the electric power converter circuit 10 outputs the direct-current voltage $V_r$ that is equal to or greater than the minimum exciting voltage $V_{rmin}$ and that is equal to or less than the maximum allowable voltage $V_{rmax}$.

The electric power converter circuit 10 may output the direct-current voltage $V_r$ that allows the first switch 8 to be driven normally in a case where a peak voltage of the alternating-current voltage $V_1$ supplied to the electric power converter circuit 10 falls in a range from a threshold voltage Vth1 to a threshold voltage Vth2 as illustrated in FIG. 2A. In one embodiment, the threshold voltage Vth2 may serve as "a threshold voltage that is equal to or less than a maximum rated voltage of the inverter". Further, the electric power converter circuit 10 may output the direct-current voltage $V_r$ that is less than the minimum exciting voltage $V_{rmin}$ that allows the first switch 8 to be in the closed state, in a case where the alternating-current voltage $V_1$ supplied to the electric power converter circuit 10 is less than the threshold voltage Vth2. The threshold voltage Vth1 may be higher than the maximum back electromotive voltage $V_{1pmax}$ of the traveling motor 3 by a margin β'. The threshold voltage Vth2 may be lower than a maximum rated voltage $V_{IGBT}$ of the inverter 4 by a margin α'. For example, the maximum rated voltage $V_{IGBT}$ may be 400 V. In some embodiments, the margins α' and β' each may be zero. The maximum back electromotive voltage $V_{1pmax}$ of the traveling motor 3 may be determined on the basis of specifications of the traveling motor 3. For example, the maximum back electromotive voltage $V_{1pmax}$ may be equivalent to a back electromotive voltage to be applied to the open electric power line IL1 upon rotation of the traveling motor 3 that rotates at a rotation speed that allows for a generation of maximum regenerative electric power. The foregoing example operation condition of the electric power converter circuit 10 may be achieved by appropriately selecting any circuit parameter of the electric power converter circuit 10. In some embodiments, a ratio of the number of turns of the transformer T1 defined as $n_2/n_1$ may be selected as necessary to achieve the foregoing example operation condition of the electric power converter circuit 10.

[Operation in Abnormal Situation]

An example is given here where: a supply of the first power E1 (e.g., the ignition power) to the system processor 5a is lost during traveling of the electric vehicle 1 due to any abnormality, in which case the drive voltage to be supplied to the first switch 8 decreases and the first switch 8 is switched to the open state accordingly; and the drive processor 5b performs the regenerative operation on the traveling motor 3, or a control performed on the inverter 4 is stopped due to a loss of power supplied to the drive processor 5b upon the rotation of the traveling motor 3.

In the example described above, a back electromotive voltage is generated at a motor coil of the traveling motor 3, with a supply destination of a regenerative current being lost. Accordingly, an extremely high back electromotive voltage is applied across the three-phase electric power lines IL1 of the traveling motor 3. If the back electromotive voltage greatly exceeds the maximum rated voltage $V_{IGBT}$ of the inverter 4, power semiconductors structuring the inverter 4, such as insulated-gate bipolar transistors (IGBTs), can break. Further, a smoothing capacitor can break if the smoothing capacitor is provided on a direct-current side of the inverter 4.

In contrast, the electric vehicle 1 according to an example embodiment may allow the drive voltage supplied to the second switch 9 to be lost and allow the second switch 9 to be switched to the closed state accordingly, simultaneously with the switching of the first switch 8 to the open state resulting from a loss of the supply of the first power E1 to the system processor 5a. Further, in a case where the high back electromotive voltage is applied to the electric power line IL1 of the traveling motor 3, the back electromotive voltage may be supplied to the electric power converter circuit 10 via the second switch 9. The direct-current voltage $V_r$ that drives the first switch 8 to be in the closed state may be outputted from the electric power converter circuit 10, in a case where the peak voltage of the back electromotive voltage, i.e., the alternating-current voltage $V_1$, becomes equal to or greater than the threshold voltage Vth2. Thus, the first switch 8 may be switched to the closed state, allowing the regenerative current to flow from the inverter 4 to the first battery 6. Note that the regenerative current flows to the first battery 6 via a diode component present between a source and a drain of a power semiconductor, even in a case where the operation of the drive processor 5b is stopped. The back electromotive voltage outputted to the inverter 4 from the electric power line IL1 is reduced by the flowing of the regenerative current, making it possible to suppress the application, to the inverter 4, of the voltage that is equal to or greater than the maximum rated voltage $V_{IGBT}$ and to avoid a deterioration of the devices structuring the inverter 4.

Thereafter, the direct-current voltage $V_r$ outputted from the electric power converter circuit 10 may become equal to or less than the minimum exciting voltage $V_{rmin}$ that allows the first switch 8 to be in the closed state and the first switch 8 may be switched to the open state accordingly, in a case where the peak voltage of the back electromotive voltage generated at the traveling motor 3, i.e., the alternating-current voltage $V_1$, becomes less than the threshold voltage Vth2. Hence, the first switch 8 is placed into the open state promptly in response to turning of the back electromotive voltage of the traveling motor 3 into the back electromotive voltage at a level that is less likely to or does not cause an adverse effect on the inverter 4, making it possible to disconnect the first battery 6 from the high voltage line of the electric vehicle 1 upon an occurrence of the abnormality.

Non-limiting examples of a case where the loss of the supply of the first power E1 described above can occur may include a case where the first power E1 itself is lost and a case where the power leading line L1 coupled to the system processor 5a has a disconnection. In an example embodiment, the drive voltage to be supplied to the second switch 9 may be drawn from a location near the control line of the first switch 8, making it possible to switch the second switch 9 to the closed state in conjunction with the switching of the first switch 8 to the open state, upon an occurrence of any of various abnormalities involving the decrease in the drive voltage of the first switch 8.

Example of Circuit Parameter of Electric Power Converter Circuit 10

For example, the circuit parameter that achieves the foregoing operation of the electric power converter circuit 10 may be determined as follows. In the following non-limiting example, a resistance component of the coil of the first switch 8 may be denoted as Rr, the direct-current voltage to be outputted from the electric power converter circuit 10 may be denoted as $V_r$, and a current to flow to the coil of the first switch 8 may be denoted as $I_r$. A minimum current that allows the first switch 8 to be in the closed state may be denoted as $I_{rmin}$, and a maximum allowable current that is less likely to or does not cause a deterioration of the coil, such as a burnout, may be denoted as $I_{rmax}$. A peak voltage of a primary coil of the transformer T1 may be denoted as $V_{1P}$, a peak voltage of a secondary coil of the transformer T1 may be denoted as $V_{2P}$, the number of turns of the primary coil may be denoted as $n_1$, the number of turns of the secondary coil may be denoted as $n_2$, a voltage on a primary side of the transformer T1 may be denoted as $V_1$, and a voltage on a secondary side of the transformer T1 may be denoted as $V_2$.

The direct-current voltage $V_r$ may be a rectified voltage of the secondary voltage $V_2$ of the transformer T1, and may be expressed by the following Expression (1). The Expression (1) may be expressed by the following Expression (2), on the basis of device parameters of the first switch 8. Accordingly, the ratio of the number of turns of the transformer T1 defined as $n_2/n_1$ may be expressed by the following Expression (3), in relation to the Expression (2).

$$V_r = \frac{1}{\sqrt{2}} \times V_{2p} \qquad (1)$$

$$V_{2p} = \sqrt{2} \times V_r = \sqrt{2} \times I_r \times R_r \qquad (2)$$

$$\frac{n_2}{n_1} = \frac{V_2}{V_1} = \frac{\sqrt{2} I_r R_r}{V_1} \qquad (3)$$

In order to operate the first switch 8 normally without damaging the first switch 8, an operating condition of a voltage lower limit of the electric power converter circuit 10 and an operating condition of a voltage upper limit of the electric power converter circuit 10 may be taken into consideration. The operating condition of the voltage lower limit of the electric power converter circuit 10 may be that the first switch 8 is driven to be in the closed state in a case where the back electromotive voltage to be supplied to the electric power converter circuit 10 corresponds to the maximum rated voltage $V_{IGBT}$ of the inverter 4. The following Expressions (4) and (5) may be satisfied in order to establish the condition described above. The conditions as defined by the Expressions (4) and (5) in relation to the Expression (3) may give the following conditional Expression (6) for the ratio of the number of turns of the transformer T1 defined as $n_2/n_1$.

$$V_1 = V_{IGBT} \qquad (4)$$

$$I_r \geq I_{rmin} \qquad (5)$$

$$\frac{n_2}{n_1} \geq \frac{\sqrt{2} I_{rmin} R_r}{V_{IGBT}} \qquad (6)$$

The operating condition of the voltage upper limit of the electric power converter circuit 10 may be that the current to flow to the coil of the first switch 8 does not exceed the maximum allowable current $I_{rmax}$ even in a case where the alternating-current voltage $V_1$ to be supplied to the electric power converter circuit 10 reaches the maximum back electromotive voltage $V_{1pmax}$ of the traveling motor 3. The following Expressions (7) and (8) may be satisfied in order to establish the condition described above. The conditions as defined by the Expressions (7) and (8) in relation to the Expression (3) may give the following conditional Expression (9) for the ratio of the number of turns of the transformer T1 defined as $n_2/n_1$.

$$V_1 = V_{1pmax} \qquad (7)$$

$$I_r < I_{rmax} \qquad (8)$$

$$\frac{n_2}{n_1} < \frac{\sqrt{2} I_{rmax} R_r}{V_{1pmax}} \qquad (9)$$

Accordingly, the ratio of the number of turns of the transformer T1 defined as $n_2/n_1$ may be determined by the following Expression (10), on the basis of the Expressions (6) and (9). The ratio of the number of turns of the transformer T1 defined as $n_2/n_1$ may be determined by the following Expression (11) where margins α and β are added to the operating conditions.

$$\frac{\sqrt{2} I_{rmin} R_r}{V_{IGBT}} \leq \frac{n_2}{n_1} < \frac{\sqrt{2} I_{rmax} R_r}{V_{1pmax}} \qquad (10)$$

$$\frac{\sqrt{2} I_{rmin} R_r}{V_{IGBT}} + \alpha \leq \frac{n_2}{n_1} < \frac{\sqrt{2} I_{rmax} R_r}{V_{1pmax}} - \beta \qquad (11)$$

The electric vehicle 1 according to an example embodiment includes the electric power converter circuit 10 that is coupled to the electric power line IL1 of the traveling motor 3 via the normally-closed second switch 9. In a case where the first switch 8 is switched to the open state due to any abnormality and the extremely high back electromotive voltage is generated at the electric power line IL1 of the traveling motor 3 accordingly, the electric power converter circuit 10 drives the first switch 8 to be in the closed state on the basis of the back electromotive voltage. Thus, the regenerative current flows from the inverter 4 to the first battery 6, making it possible to allow the back electromotive voltage to be released to the first battery 6 via the inverter 4. Hence, it is possible to suppress the application of the extremely high back electromotive voltage to the electric power line IL1 of the traveling motor 3.

In some embodiments, the electric vehicle 1 may include the processor 5, e.g., the system processor 5a, that controls the first switch 8. The second switch 9 may be driven to be in the closed state on the basis of the electric power supply voltage, e.g., the electric power supply voltage of the first power E1, that is the same as the electric power supply voltage to be supplied to the system processor 5a. Hence, it is possible to switch the first switch 8 and the second switch 9 in conjunction with each other for an abnormality in which the supply of the electric power supply voltage to the system processor 5a is lost. Further, it is possible to prevent the second switch 9 from being switched unnecessarily in a case where the system processor 5a switches the first switch 8 normally.

In some embodiments, the electric power converter circuit 10 in the electric vehicle 1 may output the direct-current voltage $V_r$ that is equal to or greater than the minimum exciting voltage $V_{rmin}$ of the first switch 8, in a case where the back electromotive voltage of the traveling motor 3 is greater than the threshold voltage Vth2. Further, the electric power converter circuit 10 may output the direct-current voltage $V_r$ that falls below the minimum exciting voltage $V_{rmin}$, in a case where the back electromotive voltage of the traveling motor 3 falls below the threshold voltage Vth2. Thus, it is possible to suppress the back electromotive voltage of the traveling motor 3 in a case where the back electromotive voltage can cause an adverse effect on the inverter 4, and to disconnect the first battery 6 from the high voltage line of the electric vehicle 1 promptly in a case there the back electromotive voltage has turned into the back electromotive voltage at a level that is less likely to or does not cause the adverse effect on the inverter 4.

In some embodiments, the electric power converter circuit 10 in the electric vehicle 1 may output the direct-current voltage $V_r$ that is equal to or less than the maximum allowable voltage $V_{rmax}$, in a case where the back electromotive voltage of the traveling motor 3 is the maximum back electromotive voltage $V_{1pmax}$. Hence, it is possible to prevent the first switch 8 from being damaged by the output from the electric power converter circuit 10 even in a case where the back electromotive voltage is extremely high.

In some embodiments, the electric power converter circuit 10 in the electric vehicle 1 may include the transformer T1 and the rectifier circuit 11. The electric power converter circuit 10 may not have a control circuit unlike a switching regulator, and include passive devices except for the rectifier circuit 11. Hence, it is possible to output the direct-current voltage $V_r$ corresponding to the alternating-current voltage $V_1$ with a reduced delay in a case where the alternating-current voltage $V_1$ is supplied.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the traveling motor may serve as the electric motor in an example embodiment described above. In some embodiments, the electric motor may be a motor that outputs drive power used for any purpose in addition to or instead of traveling.

The processor 5 such as the system processor 5a illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 5 illustrated in FIG. 1.

The invention claimed is:

1. An electric vehicle comprising:
   an electric motor;
   an inverter configured to drive the electric motor;
   a battery configured to supply electric power to the inverter;
   a first switch that is normally open, and configured to open and close an electric power line provided between the battery and the inverter;
   an electric power converter circuit; and
   a second switch that is normally closed, and coupled between an electric power line of the electric motor and the electric power converter circuit, wherein
   the electric power converter circuit is configured to, in a case where the electric power converter circuit receives a back electromotive voltage from the electric motor via the second switch, generate a voltage that drives the first switch to be in a close state, on a basis of the back electromotive voltage.

2. The electric vehicle according to claim 1, further comprising a processor configured to control the first switch, wherein
   the second switch is configured to be switched to a closed state from an open state, on a basis of an electric power supply voltage that is same as an electric power supply voltage to be supplied to the processor.

3. The electric vehicle according to claim 1, wherein
   the electric power converter circuit is configured to output a voltage that is equal to or greater than a minimum exciting voltage that causes the first switch to be in the closed state, in a case where the back electromotive voltage falls within at least a voltage range that is greater than a maximum rated voltage of the inverter, and
   the electric power converter circuit is configured to output a voltage that is less than the minimum exciting voltage, in a case where the back electromotive voltage falls within a voltage range that is less than a threshold voltage, the threshold voltage being equal to or less than the maximum rated voltage.

4. The electric vehicle according to claim 2, wherein
   the electric power converter circuit is configured to output a voltage that is equal to or greater than a minimum exciting voltage that causes the first switch to be in the closed state, in a case where the back electromotive voltage falls within at least a voltage range that is greater than a maximum rated voltage of the inverter, and the electric power converter circuit is configured to output a voltage that is less than the minimum exciting voltage, in a case where the back electromotive voltage falls within a voltage range that is less than a threshold voltage, the threshold voltage being equal to or less than the maximum rated voltage.

5. The electric vehicle according to claim 1, wherein the electric power converter circuit is configured to output a voltage that is equal to or less than a maximum allowable voltage that allows the first switch to be in the closed state, in a case where the back electromotive voltage is a maximum back electromotive voltage of the electric motor.

6. The electric vehicle according to claim 2, wherein the electric power converter circuit is configured to output a voltage that is equal to or less than a maximum allowable voltage that allows the first switch to be in the closed state, in a case where the back electromotive voltage is a maximum back electromotive voltage of the electric motor.

7. The electric vehicle according to claim 3, wherein the electric power converter circuit is configured to output a voltage that is equal to or less than a maximum allowable voltage that allows the first switch to be in the closed state, in a case where the back electromotive voltage is a maximum back electromotive voltage of the electric motor.

8. The electric vehicle according to claim 4, wherein the electric power converter circuit is configured to output a voltage that is equal to or less than a maximum allowable voltage that allows the first switch to be in the closed state, in a case where the back electromotive voltage is a maximum back electromotive voltage of the electric motor.

9. The electric vehicle according to claim 1, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

10. The electric vehicle according to claim 2, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

11. The electric vehicle according to claim 3, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

12. The electric vehicle according to claim 4, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

13. The electric vehicle according to claim 5, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

14. The electric vehicle according to claim 6, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

15. The electric vehicle according to claim 7, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

16. The electric vehicle according to claim 8, wherein the electric power converter circuit includes:
a transformer configured to decrease the back electromotive voltage; and
a rectifier circuit configured to rectify an output from the transformer, and
the electric power converter circuit is configured to supply, to a control line of the first switch, a voltage to be outputted from the rectifier circuit or a voltage in which the voltage to be outputted from the rectifier circuit is smoothed.

* * * * *